US008391125B2

(12) United States Patent
Zhou et al.

(10) Patent No.: US 8,391,125 B2
(45) Date of Patent: Mar. 5, 2013

(54) METHOD AND DEVICE FOR MANAGING CHANNEL MATRIX

(75) Inventors: Jun Zhou, Shenzhen (CN); Gouzhou Long, Fremont, CA (US); Dong Wei, Austin, TX (US); Liming Fang, Shenzhen (CN); Zihuan Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 552 days.

(21) Appl. No.: 12/202,921

(22) Filed: Sep. 2, 2008

(65) Prior Publication Data

US 2008/0317035 A1 Dec. 25, 2008

(30) Foreign Application Priority Data

Nov. 20, 2006 (CN) .......................... 2006 1 0145544
Nov. 20, 2007 (WO) ............... PCT/CN2007/003275

(51) Int. Cl.
*H04J 1/12* (2006.01)
*H04J 3/10* (2006.01)
(52) U.S. Cl. ........................................ 370/201; 379/417
(58) Field of Classification Search .................. None
See application file for complete search history.

(56) References Cited

U.S. PATENT DOCUMENTS

| | | | | |
|---|---|---|---|---|
| 7,356,049 | B1 * | 4/2008 | Rezvani | 370/484 |
| 2002/0126834 | A1 * | 9/2002 | Seibert | 379/417 |
| 2004/0095921 | A1 | 5/2004 | Kerpez | |
| 2005/0105473 | A1 | 5/2005 | Hausman et al. | |
| 2005/0141631 | A1 * | 6/2005 | Takano | 375/267 |
| 2007/0263711 | A1 * | 11/2007 | Kramer et al. | 375/222 |
| 2008/0049855 | A1 * | 2/2008 | Duvaut et al. | 375/260 |
| 2008/0214118 | A1 * | 9/2008 | Ilani et al. | 455/67.13 |
| 2008/0219290 | A1 * | 9/2008 | Cioffi et al. | 370/465 |
| 2009/0046568 | A1 * | 2/2009 | Xu | 370/201 |
| 2010/0278033 | A1 * | 11/2010 | Ilani | 370/201 |

FOREIGN PATENT DOCUMENTS

| | | |
|---|---|---|
| CN | 1285672 A | 2/2001 |
| CN | 1524396 A | 8/2004 |
| WO | 02/063813 A2 | 8/2002 |
| WO | 03/009541 A1 | 1/2003 |
| WO | 2004/047325 A1 | 6/2004 |

OTHER PUBLICATIONS

Duvaut et al., Adaptive Off-Diagonal MIMO Pre-coder (ODMP) for Downstream DSL Self FEXT Cancellation, 2007, IEEE Globecom 2007, p. 2910-2915.*

(Continued)

*Primary Examiner* — Timothy J Weidner
(74) *Attorney, Agent, or Firm* — Brinks Hofer Gilson & Lione

(57) ABSTRACT

A method for managing a channel matrix is provided. The method includes: obtaining whether a user logs on or logs off; adding a history record of channel information of the user to a channel matrix when the user logs on; recording current channel information of the user in the channel matrix and deleting the channel information of the user from the channel matrix when the user logs off. The channel matrix may be timely updated based on when the user logs on or off. Accordingly, the channel crosstalk is eliminated timely and correctly according to the channel matrix, and the affection on the crosstalk eliminating capacity caused by the user logs on or logs off can be avoided.

15 Claims, 7 Drawing Sheets

OTHER PUBLICATIONS

Supplementary European Search Report issued in corresponding European Patent Application No. 07 84 5661.3; mailed May 14, 2009.

Office Action issued in corresponding Chinese Patent Application No. 200610145544.2; issued Apr. 22, 2010.

Written Opinion of the International Searching Authority issued in corresponding PCT Application No. PCT/2007/003275; mailed Mar. 6, 2006.

International Search Report Issued in corresponding PCT Application PCT/CN2007/003275 mailed Mar. 6, 2008.

* cited by examiner

METHOD AND DEVICE FOR MANAGING CHANNEL MATRIX

FIELD

The present embodiments relate to the field of communications, in particular, to a method and a device for managing a channel matrix.

BACKGROUND

Digital Subscriber Line (xDSL) is a high-speed data transmission technology in which the data is transmitted on Unshielded Twist Pair (UTP) lines. Except for the xDSL based on the baseband transmission, such as ISDN DSL (IDSL), and Single-pair High-speed DSL (SHDSL), the xDSL based on the passband transmission uses Frequency Division Duplexing (FDD), so that the xDSL service and the Plain Old Telephone Service (POTS) may coexist on the same twisted pair. The xDSL service uses the high frequency band and the POTS uses the baseband below 4 KHz. The POTS signal and the xDSL signal are separated by a splitter. The xDSL based on the passband transmission uses the Discrete Multitone Modulation (DMT). The system, which provides the multiple xDSL access, is the Digital Subscriber Line Access Multiplexer (DSLAM). FIG. 1 shows the systemic model of the DSLAM.

As a transmission channel, the channel capacity of the phone twist pair must satisfy Shannon's channel capacity formula:

$$C = B \cdot \log_2\left(1 + \frac{S}{N}\right).$$

In Equation 1, C is the channel capacity, B is the signal bandwidth, S is the signal energy, and N is the noise energy. The channel capacity C may be improved by improving the signal bandwidth and the signal energy. The signal bandwidth B depends on the amplitude-frequency characteristic and the signal energy S is limited by the device, and the spectral compatibility. The signal bandwidth B and the signal energy S are both limited to a certain range. Accordingly, the transmission capacity of xDSL may not be further improved. The transmission capacity of the lines can be appropriately improved by reducing the noise energy N.

With the improvement of the frequency band employed by the xDSL technology, the crosstalk, such as the crosstalk in the high-frequency band, becomes prominent. Because the upstream and downstream channels of xDSL employ the FDMA, the Near-End crosstalk (NEXT) may hardly affect the capacity of the system. The Far-End crosstalk (FEXT) will affect the transmission capacity of the transmission line seriously. When a plurality of users based on the same cable requires activating the xDSL service, the FEXT may cause a low speed on some lines, an unstable performance or even an unactivable service. The outgoing line ratio of the DSLAM is low.

The vectored-DSL technology is proposed in the field. The vectored-DSL technology mainly utilizes the possibility of performing the tranceiving coordinately at the DSLAM end and uses the signal processing method to counteract interfere of the FEXT, so that no interfere of the FEXT exists in each signal and the transmission capacity is improved. FIG. 2 and FIG. 3 show that the DSLAM end sends signals simultaneously and the DSLAM end receives signals simultaneously, respectively.

The shared channel H shown in FIG. 2 and FIG. 3 may be represented with a matrix in the frequency domain as follows.

$$H(f) = [H_{km}(f)]_{k=1 \ldots L, m=1 \ldots L}$$

$$= \begin{bmatrix} H_{11}(f) & H_{12}(f) & \ldots & H_{1L}(f) \\ H_{21}(f) & H_{22}(f) & \ldots & H_{2L}(f) \\ \vdots & \vdots & \ddots & \vdots \\ H_{L1}(f) & H_{L2}(f) & \ldots & H_{LL}(f) \end{bmatrix}_{L \times L}$$

In the matrix, $H_{km}(f)$ is an equation representing the transmission from line pair m to line pair k. When m=k, $H_{km}(f)$ represents a direct channel of line pair m, and when m≠k, $H_{km}(f)$ represents a crosstalk channel from line pair m to line pair k. The X(f) is an L×1 channel input vector, the Y(f) is an L×1 channel output vector, and N(f) is a noise vector. Therefore, the channel transmission equation is represented as follows.

$$Y(f) = H(f)X(f) + N(f)$$

Because of using FDD technology in DSL, only the FEXT crosstalk is considered. The method for eliminating the crosstalk includes the QR decomposition method and the SVD decomposition method. In vector DSL, the downstream crosstalk is eliminated by the vector transmitter and the upstream crosstalk is eliminated by the vector receiver.

In QR decomposition method, Generalized Decision Feedback Equalization (GDFE) may be used to estimate the input vector X of the user. GDFE is similar to the DFE (a method for eliminating interferes between signals transmitted in a single channel) and can be applied to any channel in the form of y=Hx+n.

FIG. 4 is a diagram showing the downstream vector transmiter, and the detailed process of the downstream vector transmiter.

According to the QR decomposition method, $H^T$ matrix may also be represented as: $H_i^T = Q_i \cdot R_i$, and $R_i$ is an upper triangular matrix, and $Q_i$ is a unitary matrix. For example, $Q_i Q_i^* = Q_i^* Q_i = I$, the superscript * represents the conjugation transpose transformation, and $H_i^T$ is the transpose matrix of H. Hence, $H_i = R_i^T Q_i^T$.

Assuming that $x_i = Q_i^{T*} x_i'$ and $x_i' = R_i^{-T} \text{diag}(R_i^T) \tilde{x}_i$, and diag represents the diagonal matrix, then:

$y_i = H_i x_i + N_i = R_i^T Q_i^T Q_i^{T*} R_i^{-T} \text{diag}(R_i^T) \tilde{x}_i + N_i$. As for a channel without noise, the output is $\hat{y} = \text{diag}(R_i^T) \tilde{x}_i$, which is a diagonal matrix. Therefore, the crosstalk is eliminated.

For example, when L=4,
$H_i^T = Q_i R_i$, and R may be represented as:

$$R = \begin{bmatrix} R_{11} & R_{12} & R_{13} & R_{14} \\ 0 & R_{22} & R_{23} & R_{24} \\ 0 & 0 & R_{33} & R_{34} \\ 0 & 0 & 0 & R_{44} \end{bmatrix}$$

Assuming that $x_i = Q_i^{T*} x_i'$ and $x_i' = R_i^{-T} \text{diag}(R_i^T) \tilde{x}_i$, then $$y_i = H_i x_i + N_i$$

-continued $$= R_i^T Q_i^T Q_i^{T*} R_i^{-T} \text{diag}(R_i^T) \tilde{x}_i + N_i$$

$$= \text{diag}(R_i^T) \tilde{x}_i + N_i$$

$$= \begin{bmatrix} R_{11}^T & 0 & 0 & 0 \\ 0 & R_{22}^T & 0 & 0 \\ 0 & 0 & R_{33}^T & 0 \\ 0 & 0 & 0 & R_{44}^T \end{bmatrix} \cdot \tilde{x}_i + N_i$$

$$= \begin{bmatrix} R_{11}^T \tilde{x}_1 & 0 & 0 & 0 \\ 0 & R_{22}^T \tilde{x}_2 & 0 & 0 \\ 0 & 0 & R_{33}^T \tilde{x}_3 & 0 \\ 0 & 0 & 0 & R_{44}^T \tilde{x}_4 \end{bmatrix} + N_i$$

The outputs for four users are $R_{11}^T \tilde{x}_1$, $R_{22}^T \tilde{x}_2$, $R_{33}^T \tilde{x}_3$, $R_{44}^T \tilde{x}_4$, respectively. Therefore, the crosstalk is eliminated.

FIG. 5 is a diagram showing the upstream vector receiver.

According to the QR decomposition method, $H_i$ matrix may also be represented as: $H_i = Q_i \cdot R_i$, and $R_i$ is an upper triangular matrix, and $Q_i$ is a unitary matrix. For example, $Q_i Q_i^* = Q_i^* Q_i = I$. The superscript * represents the conjugation transpose transformation.

The upstream receiving vector is:

$$Y_i = H_i x_i + N_i$$

Both sides of the above equation are multiplied by $Q_i^*$, then $$\hat{Y}_i = Q^*(H_i x_i + N_i)$$

$$\hat{Y}_i = Q_i^* \cdot Q_i \cdot R_i x_i + Q_i^* \cdot N_i = R_i x_i + Q_i^* \cdot N_i.$$

As shown in the above equation, when a channel is a channel without noise, the output is $\hat{Y}_i = R_i x_i$, $1 \leq i \leq L$. $R_i$ is an upper triangular matrix.

The output value may be estimated by GDFE. As can be seen, the Lth output has a value without the crosstalk and the Lth output value may be obtained with a simple decoder. As for the (L−1)th output, the crosstalk on the (L−1)th line from the Lth line is eliminated by subtracting the Lth estimated result from the (L−1)th output. Through a simple estimation, the (L−1)th output value may be obtained. The first output value may be obtained by subtracting the previous estimated value one by one. Therefore, the crosstalk between lines is eliminated.

For example, when L=4, $H_i = Q_i R_i$, and $R_i$ may be represented as:

$$R_i = \begin{bmatrix} R_{11} & R_{12} & R_{13} & R_{14} \\ 0 & R_{22} & R_{23} & R_{24} \\ 0 & 0 & R_{33} & R_{34} \\ 0 & 0 & 0 & R_{44} \end{bmatrix}$$

As for $Y_i = H_i x_i + N_i$, both sides of the equation are multiplied by $Q_i^*$, then $$\hat{Y}_i = Q_i^* \cdot Q_i^* \cdot R_i x_i + Q_i^* \cdot N_i$$

$$= R_i x_i + Q_i^* \cdot N_i$$

$$= \begin{bmatrix} R_{11} & R_{12} & R_{13} & R_{14} \\ 0 & R_{22} & R_{23} & R_{24} \\ 0 & 0 & R_{33} & R_{34} \\ 0 & 0 & 0 & R_{44} \end{bmatrix} \cdot x_i + Q_i^* N_i;$$

as for a channel without noise, $$\hat{Y}_i = \begin{bmatrix} R_{11} & R_{12} & R_{13} & R_{14} \\ 0 & R_{22} & R_{23} & R_{24} \\ 0 & 0 & R_{33} & R_{34} \\ 0 & 0 & 0 & R_{44} \end{bmatrix} \cdot \begin{bmatrix} x_1 \\ x_2 \\ x_3 \\ x_4 \end{bmatrix}$$

$$= \begin{bmatrix} R_{11}x_1 + R_{12}x_2 + R_{12}x_3 + R_{14}x_4 \\ R_{22}x_2 + R_{23}x_3 + R_{24}x_4 \\ R_{33}x_3 + R_{34}x_4 \\ R_{44}x_4 \end{bmatrix}$$

As can be seen, the fourth output has a value without the crosstalk, and the fourth user output value may be estimated through a simple decoder. The crosstalk on the third user from the fourth user is eliminated by subtracting the fourth estimated result from the third output. Through a simple estimation, the third user output value is obtained. The first user output value may be obtained by subtracting the previous estimated value one by one. Therefore, the crosstalk is eliminated.

The user channel information may be used for eliminating the crosstalk. However, when a user logs on, the user may cause the crosstalk on other user channel. Because the crosstalk cancellation device (or, the precoder) is calculated from the user channel information obtained by matrix H before the user logs on, the balance is broken and the crosstalk eliminating capacity is lowered.

SUMMARY

The present embodiments may obviate one or more of the drawbacks or limitations inherent in the related art. For example, in one embodiment, a channel matrix is managed, so as to update the channel matrix and eliminate crosstalk timely and correctly.

In one embodiment, a method for managing a channel matrix is provided. The method may be used to update the DSL channel matrix. The method may include determining whether a user logs on or not. When the user logs on, a history record of channel information of the user is added to a channel matrix. When the user logs off, current channel information of the user in the channel matrix is recorded and the channel information of the user from the channel matrix is deleted.

In another embodiment, a device for managing a channel matrix is provided. The device may be used to update the DSL channel matrix. The device for managing a channel matrix includes an obtaining unit, a storage unit, a channel matrix unit and a management unit, in which the storage unit is adapted to store a history record of channel information of users; the channel matrix unit is adapted to store a channel matrix comprising channel information of a current logging on user; the obtaining unit is adapted to obtain whether the user logs on or not and send an indication for indicating that the user logs on to the management unit when it is obtained that the user logs on, or send an indication for indicating that the user logs off to the management unit when it is obtained that the user logs off; and the management unit is adapted to add the history record of the channel information of the user to the channel matrix according to the indication for indicating that the user logs on, and record the channel information of the user in the channel matrix into the storage unit and delete the channel information of the user from the channel matrix according to the indication for indicating that the user logs off.

According to the embodiments of the present invention, the history record of the user channel information is added to the channel matrix when the user logs on; and the user channel information in the channel matrix is recorded when the user logs off. Therefore, the channel matrix is updated timely according as whether the user logs on or not. The problems in the prior art, including the channel matrix can not be updated timely and correctly according as whether the user logs on or not and thus the crosstalk eliminating capacity is lowered, and are solved by updating the channel matrix timely and correctly. Hence, the crosstalk eliminating capacity is improved during implementing the crosstalk elimination.

DETAILED DESCRIPTION

For the channel crosstalk of the DSL user, the present embodiments provide a simple and effective method for managing a channel matrix dynamically, so that the crosstalk counteract capability is ensured. Detailed descriptions of the present embodiments will be provided by reference to the drawings.

The present embodiments may obviate one or more problems or drawbacks inherent in the related art. For example, in one embodiment, whether the user logs on or logs off may be timely obtained (determined). In another example, the channel matrix may be timely updated after the user logs on or logs off so as to eliminate the crosstalk according to the information in the channel matrix.

Whether the user logs on or logs off may be timely obtained. In the vectored-DSL technology, because the crosstalk cancellation is performed at the central office (CO) end through tranceiving process coordinately for all users, a uniform management is performed for all users by the CO end. Through the DSLAM management layer at the CO end, whether the user logs on or logs off can be directly obtained.

The channel matrix may be timely updated after the user logs on or logs off. Because the user logs on and the balance is broken, it is expected that the channel information (e.g., the direct channel and the crosstalk channel) of the logging on user can be obtained and be added into the channel matrix timely and rapidly, so as to counteract the crosstalk caused by the logging on user and the crosstalk on the logging on user from other users. According to one embodiment, a database is configured at the CO end for storing the history record of the channel information for all users. When a user logs on, the history record of the channel information of the user is read from the database and added in to the channel matrix. When a user logs off, the channel information of the user in the channel matrix is stored in the database. Because the channel varies slowly with respect to time, the channels are tracked and adjusted and the channel information of the user is updated according to the result of the adjustment. When the user logs off, the current channel information of the user is stored into the database so as to be used in the next time.

Figure 1:
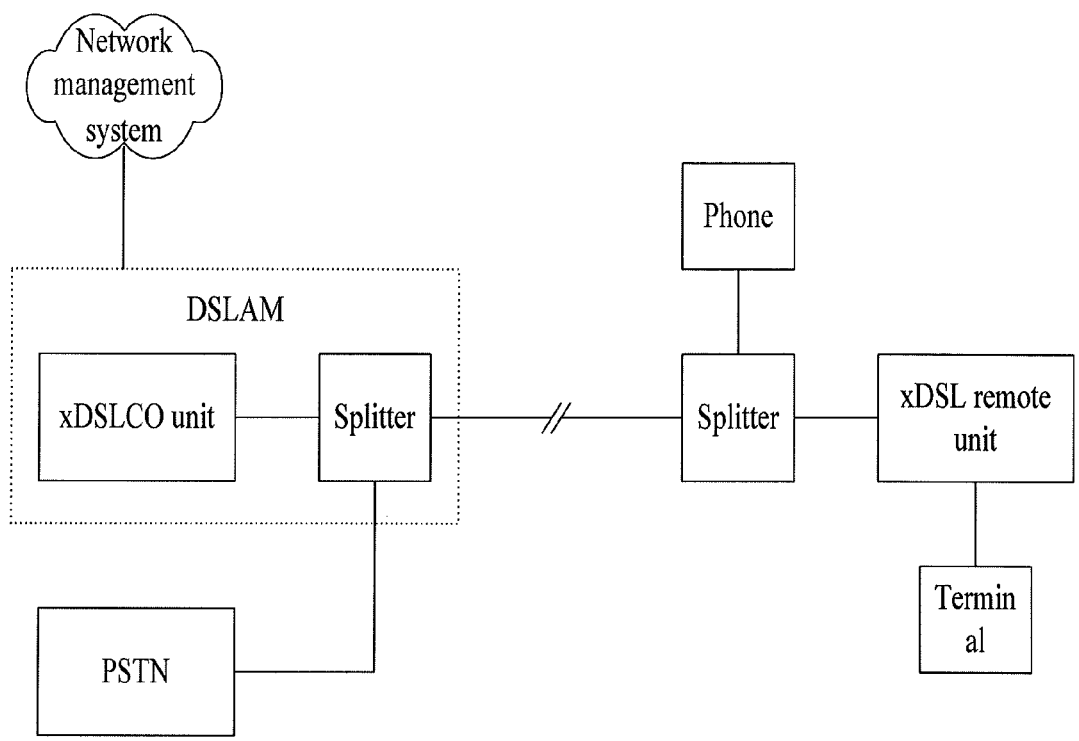
FIG. 1 is a schematic diagram illustrating a reference model of an xDSL system.
Figure 2:
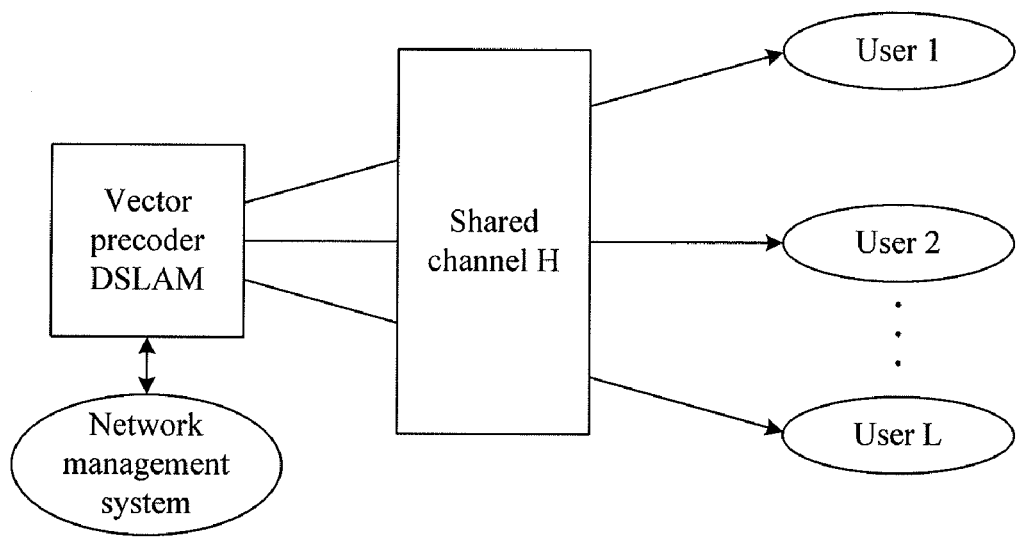
FIG. 2 is a schematic diagram illustrating the technology of the prior art in which the transmitting is performed coordinately at the DSLAM end and the receiving is performed separately at the user end.
Figure 3:
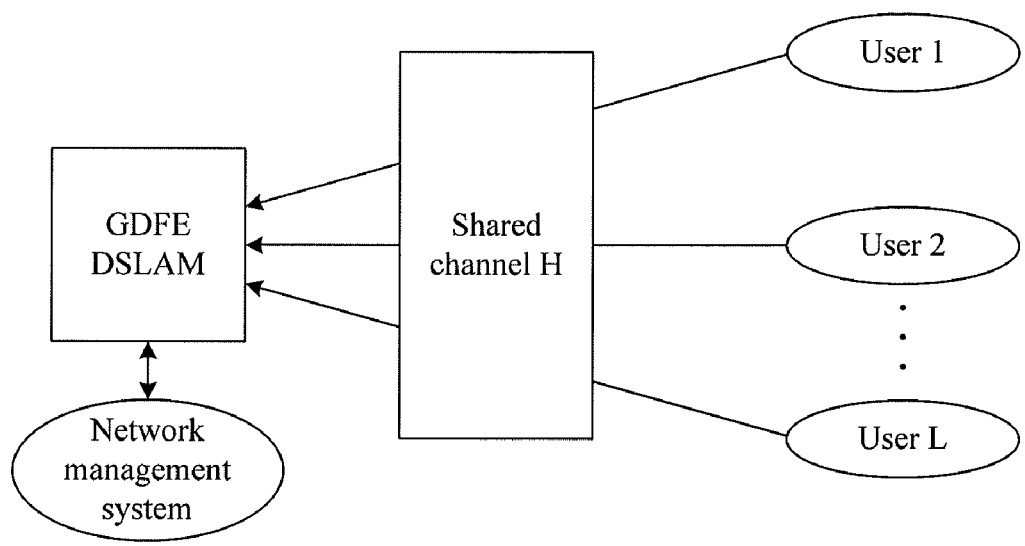
FIG. 3 is a schematic diagram illustrating the technology of the prior art in which the transmitting is performed separately at the user end and the receiving is performed coordinately at the DSLAM end.
Figure 4:
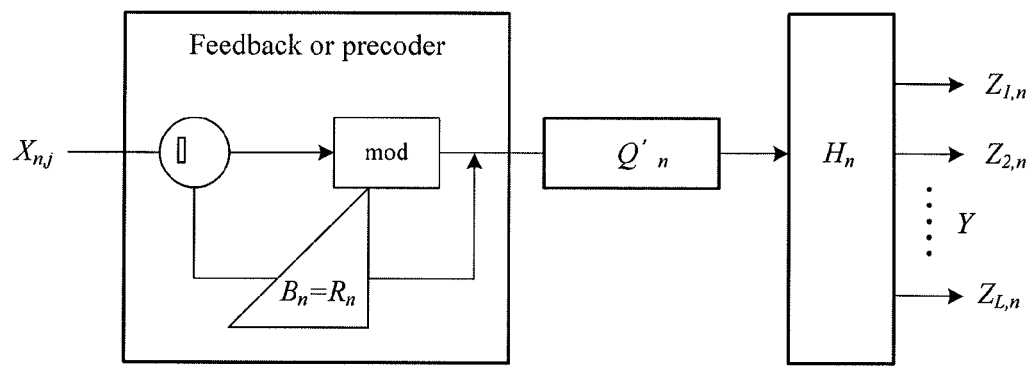
FIG. 4 is a schematic diagram illustrating the downstream crosstalk transmitter in the prior art.
Figure 5:
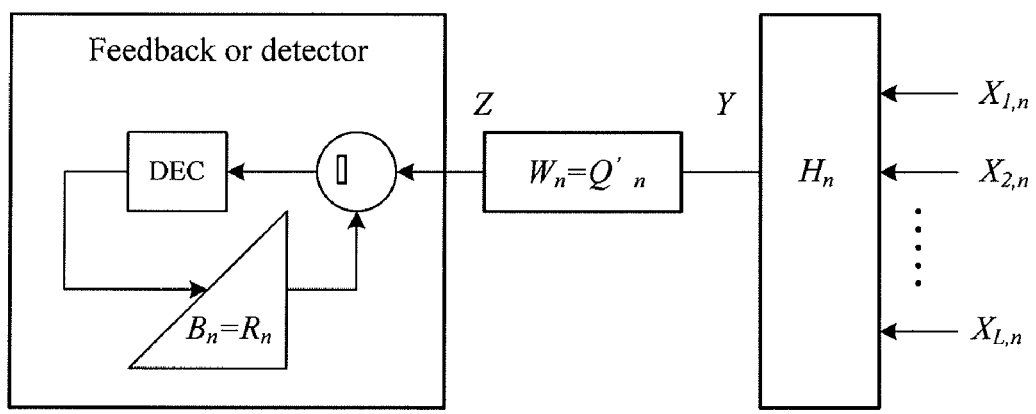
FIG. 5 is a schematic diagram illustrating the upstream crosstalk receiver in the prior art.
Figure 6:
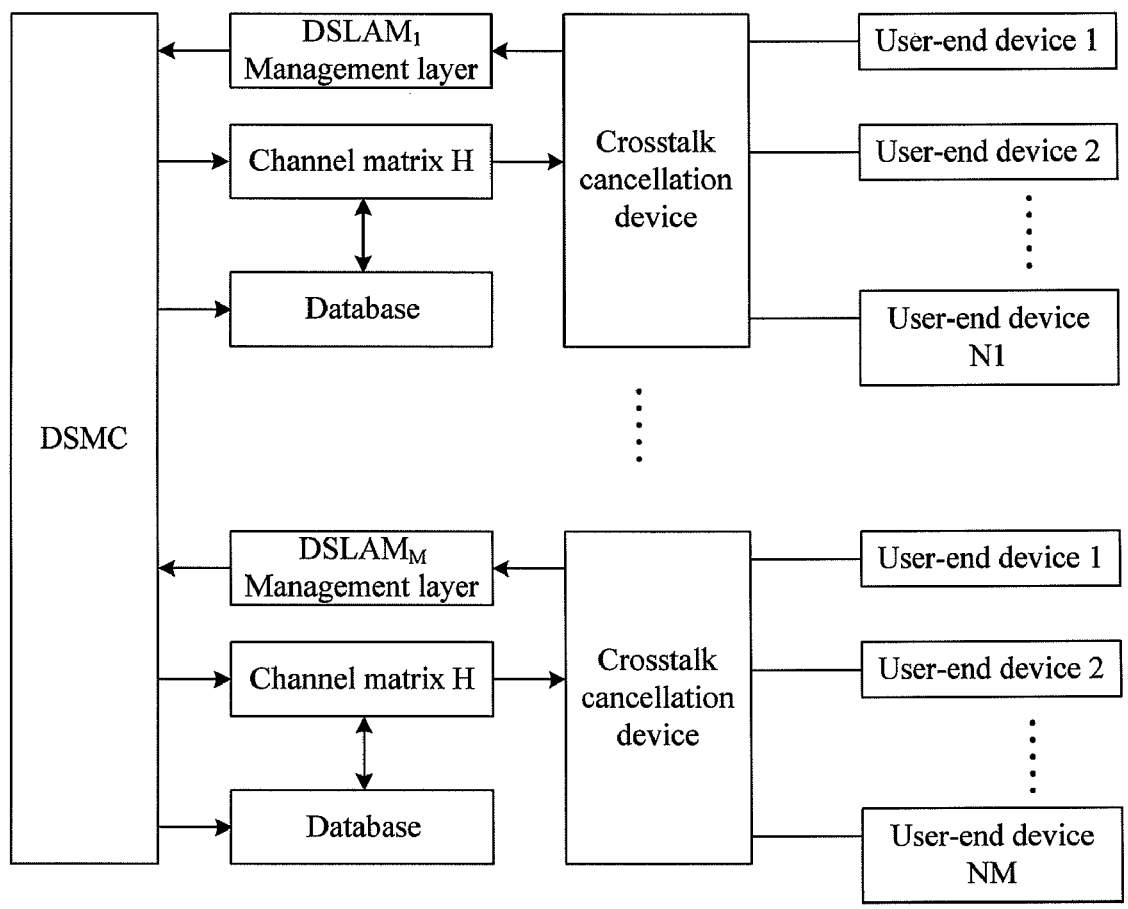
FIG. 6 is a flow chart illustrating the process for managing the channel matrix H according to one embodiment.

FIG. 6 is a flow chart illustrates one process for managing a channel matrix H according to one embodiment.

In FIG. 6, the DSLAM management layer is responsible for obtaining whether the user logs on or logs off, the Dynamic Spectrum Management (DSM) Center (DSMC) is manages the channel matrix H and the database. The management for the matrix H may include the following.

The DSLAM management layer may obtain whether the user logs on or off. Because all users are managed collectively at the CO end, the DSLAM management layer can obtain the operation status of the user and can obtain whether the user logs on or logs off.

When the DSLAM management layer obtains that user 1 logs off, the DSLAM management layer sends the information that user 1 logs off to the DSMC. When the DSMC obtains that user 1 logs off, the DSMC stores the channel information of the user into the database. When the user logs on next time, the history record of the channel information stored in the database is used to update the channel matrix H. The DSMC may delete the channel information of the user from the channel matrix H.

For example, if current channel matrix H (i.e. user channel information matrix) is as follows:

$$\begin{bmatrix} H_{11}(f) & H_{12}(f) & \cdots & H_{1L}(f) \\ H_{21}(f) & H_{22}(f) & \cdots & H_{2L}(f) \\ \vdots & \vdots & \ddots & \vdots \\ H_{L1}(f) & H_{L2}(f) & \cdots & H_{LL}(f) \end{bmatrix}_{L \times L}$$

where L represents the number of current logging on users, the user channel information stored in the database in the form of array may be as follows:

$$\begin{bmatrix} H'_{11}(f) & H'_{12}(f) & \cdots & H'_{1M}(f) \\ H'_{21}(f) & H'_{22}(f) & \cdots & H'_{2M}(f) \\ \vdots & \vdots & \ddots & \vdots \\ H'_{M1}(f) & H'_{M2}(f) & \cdots & H'_{MM}(f) \end{bmatrix}_{M \times M}$$

where M represents the number of the users connected with the DSLAM and M≧L.

When user 1 logs off, the direct channel information and the crosstalk channel information of user 1 in matrix H (e.g., the crosstalk channel of user 1 including the crosstalk channel for other users caused by user 1 and the crosstalk channel for user 1 caused by other users) may be stored in the database. For example, the original channel information of user 1 in the database, such as $H_{1m}'(f)(\bigcirc=1, \ldots L)$ and $H_{m1}'(f)(m=1, \ldots$ L), is replaced with $H_{1m}(f)(m=1, \ldots L)$ and $H_{m1}(f)(m=1, \ldots L)$. The direct channel information and the crosstalk channel information of user 1 may be deleted from the channel matrix H, and the updated channel matrix H may be as follows:

$$\begin{bmatrix} H_{22}(f) & H_{23}(f) & \ldots & H_{2L}(f) \\ H_{32}(f) & H_{33}(f) & \ldots & H_{3L}(f) \\ \vdots & \vdots & \ddots & \vdots \\ H_{L2}(f) & H_{L3}(f) & \ldots & H_{LL}(f) \end{bmatrix}_{(L-1)\times(L-1)}$$

The DSLAM management layer at CO end may monitor the operation status of the user. For each logging off user, the channel matrix H and the database information are updated in accordance with the above process flow. The CO end may track and adjust the channels of all logging on users and update the channel matrix H according to the result of the adjustment.

When the CO end obtains that user 1 logs on, the CO end sends the information that user 1 logs on to the DSMC.

When the DSMC obtains that user 1 logs on, the DSMC may add the channel information of user 1 in the database to the channel matrix H to update the matrix H. For example, the channel matrix H before user 1 logs on may be as follows:

$$\begin{bmatrix} H_{22}(f) & H_{23}(f) & \ldots & H_{2L}(f) \\ H_{32}(f) & H_{33}(f) & \ldots & H_{3L}(f) \\ \vdots & \vdots & \ddots & \vdots \\ H_{L2}(f) & H_{L3}(f) & \ldots & H_{LL}(f) \end{bmatrix}_{(L-1)\times(L-1)}$$

where L−1 represents the number of all logging on users.

The user channel information stored in the database in the form of array may be as follows:

$$\begin{bmatrix} H'_{11}(f) & H'_{12}(f) & \ldots & H'_{1M}(f) \\ H'_{21}(f) & H'_{22}(f) & \ldots & H'_{2M}(f) \\ \vdots & \vdots & \ddots & \vdots \\ H'_{M1}(f) & H'_{M2}(f) & \ldots & H'_{MM}(f) \end{bmatrix}_{M\times M}$$

where M represents the number of the users connected with the DSLAM and $M \geq L$.

When user 1 logs on, the channel information of user 1 in the database, for example, $H_{1m}'(f)(m=1, \ldots L)$ and $H_{m1}'(f)(m=1, \ldots L)$, may be added into the channel matrix.

The channel matrix may be updated as:

$$\begin{bmatrix} H'_{11}(f) & H'_{12}(f) & \ldots & H'_{1L}(f) \\ H'_{21}(f) & H_{22}(f) & \ldots & H_{2L}(f) \\ \vdots & \vdots & \ddots & \vdots \\ H'_{L1}(f) & H_{L2}(f) & \ldots & H_{LL}(f) \end{bmatrix}_{L\times L}$$

Because the channel varies slowly with respect to time, the user channels may be tracked and adjusted after the user channel information is added into matrix H. The history data of the user channel information is introduced. The history data may be the channel information when the user logs off last time. The difference between the history data and current channel may be substantially same or different. The history data may gradually approach current channel information of the user through the tracking and adjustment. Thus, the correctness of the channel matrix is ensured and the crosstalk elimination performance is ensured.

The CO end may update the channel matrix H for each logging on user in accordance with the above process flow.

If the CO end connects with a plurality of users, only one DSLAM is insufficient. The CO end may include a plurality of DSLAMs. Each DLSAM sends the obtained information regarding whether the user logs on or logs off to the DSMC. The DSMC will update the channel matrix H according to the information regarding whether the user logs on or logs off reported by each DSLAM in accordance with the above process flow.

The channel matrix H may be used for eliminating the crosstalk. For example, the channel matrix H may be used to eliminate the crosstalk generated when the user logs on or logs off. The method for eliminating the crosstalk may include QR decomposition and/or the SVD decomposition.

In one embodiment, a device for managing the channel matrix using the above dynamic management channel matrix may be provided.

Figure 7:
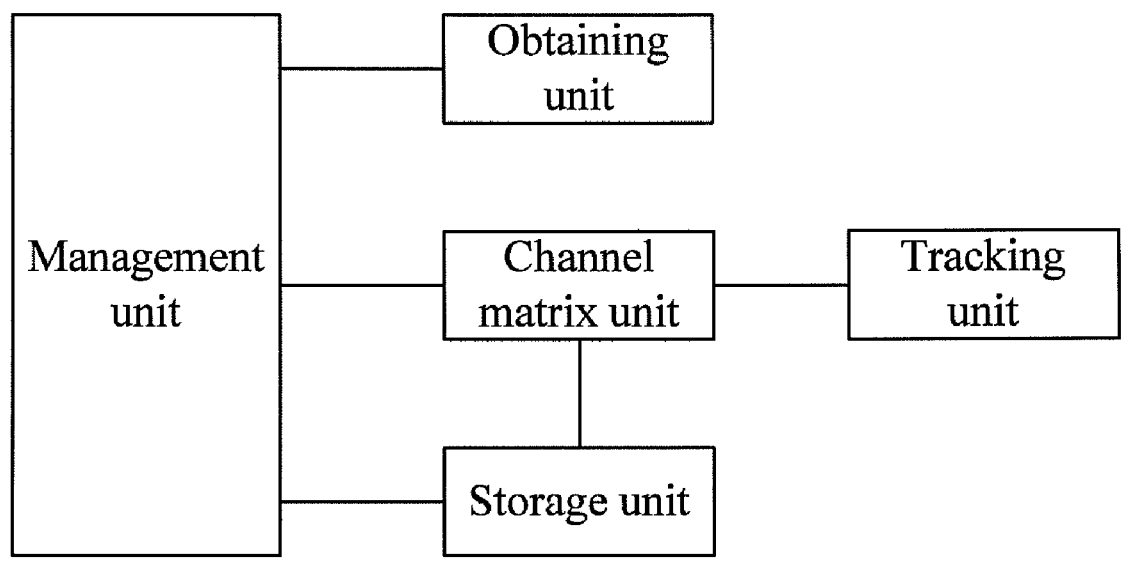
FIG. 7 is a schematic diagram illustrating the device for managing the channel matrix according to one embodiment.

FIG. 7 is a schematic diagram illustrating the device for managing the channel matrix. The device may be located at the CO end. The device may include an obtaining unit, a storage unit, a channel matrix unit, a management unit and a fine adjustment unit.

The obtaining unit may be a DSLAM management entity. The obtaining unit may be operable to obtain whether the user logs on or logs off. The obtaining unit may be operable to send an indication that indicates that the user logs on to the management unit when it is obtained that the user logs on, or send an indication that indicates that the user logs off to the management unit when it is obtained that the user logs off. The obtaining unit may be a determining unit that determines whether the user logs on or logs off.

The management unit is operable to add a history record of user channel information (e.g., the history record of the channel information when the user logs off last time) to the channel matrix of the channel matrix unit according to the indication that indicates that the user logs on sent from the obtaining unit, and record the user channel information in the channel matrix of the channel matrix unit into the storage unit and delete the user channel information from the channel matrix according to the indication for indicating that the user logs off sent from the obtaining unit.

The storage unit is operable to store the history record of the user channel information. The storage unit may be a database storage unit operable to store the history record of the user channel information into the database.

The channel matrix unit is operable to store the user channel matrix for a current logging on user.

The tracking and adjustment unit is operable to track and adjust channels of the logging on user and send the result of the adjusted result to the channel matrix unit to update the channel matrix.

If the CO end connects with a plurality of users, the CO end may include a plurality of DSLAMs. Each DSLAM is responsible for a number of user channels and corresponds to a channel matrix. Each DSLAM corresponds to one channel matrix management device as described above.

The channel matrix unit may connect with a crosstalk elimination device. The crosstalk elimination device uses the channel matrix to implement the crosstalk elimination with QR decomposition and/or SVD decomposition.

According to the embodiments of the present invention, the DSLAM management layer is operable to obtain (determine) whether a user logs on or logs off and is operable to manages the channel matrix based upon the determination. When it is obtained that a user logs off, the channel information of the user is deleted from the channel matrix and is stored in the database so as to be used for the next time when the user logs on. When it is obtained that a user logs on, the channel information of the user is read from the database and is added into the channel matrix. Accordingly, the channel matrix is timely updated according as whether the user logs on or logs off. The affection on the crosstalk eliminating capacity caused by the user logs on or logs off may be avoided by updating the channel matrix timely. The method and system according to the embodiments of the present invention is simple and easy to be implemented.

In one embodiment, computer readable media comprises computer program codes for managing a Digital Subscriber Line channel matrix. The computer program codes may be logic encoded in one or more tangible media for execution. As used herein, logic encoded in one or more tangible media is defined as instructions that are executable by a programmed processor and that are provided on computer-readable storage media, memories, or a combination thereof. When executed, the logic is operable to determine when a user logs on or logs off, add a history record of channel information of the user to a channel matrix when the user logs on; and record current channel information of the user in the channel matrix and delete the channel information of the user from the channel matrix when the user logs off. When executed, the logic encoded in one or more tangible media is also operable to store recorded channel information to a database for storing channel information of the user when the user logs off; and read the history records of the channel information of the user from the database and adding the history records of the channel information of the user to the channel matrix when the user logs on. When executed, the logic encoded in one or more tangible media is also operable to perform a tracking to a channel of the user in the channel matrix, and updating the channel information of the user in the channel matrix with adjusted channel information. When executed, the logic encoded in one or more tangible media is also operable to eliminate the crosstalk on a channel of the user according to the channel matrix. For example, the logic may be operable to eliminate the crosstalk between users using QR decomposition or SVD decomposition according to the channel matrix.

Additional advantages and modifications will readily occur to those skilled in the art. Therefore, the invention in its broader aspects is not limited to the specific details and representative embodiments shown and described herein. Accordingly, various modifications and variations may be made without departing from the scope of the invention as defined by the appended claims and their equivalents.

What is claimed is:

1. A method for managing a Digital Subscriber Line (DSL) channel matrix, comprising:
   determining whether a user logs on or logs off;
   adding a history record of channel information of the user to the DSL channel matrix when the user logs on; and
   recording current channel information of the user in the DSL channel matrix, storing the recorded current channel information to a database for storing channel information of the user and deleting the current channel information of the user from the DSL channel matrix when the user logs off.

2. The method according to claim 1, wherein the history record of the channel information of the user is channel information recorded when the user logged off last time.

3. The method according to claim 1, wherein adding a history record of channel information of the user to the DSL channel matrix comprises:
   reading the history record of the channel information of the user from the database and adding the history record of the channel information of the user to the DSL channel matrix.

4. The method according to claim 1, further comprising: performing a tracking to a channel of the user in the DSL channel matrix, and updating the current channel information of the user in the DSL channel matrix with adjusted channel information.

5. The method according to claim 1, wherein the current channel information of the user comprises direct channel information of the user, crosstalk channel information caused by the user for other users, or crosstalk channel information caused by other users for the user.

6. The method according to claim 1, wherein determining whether the user logs on or logs off comprises: determining whether the user logs on or logs off using a DSL Access Multiplex (DSLAM) management layer of a Central Office end.

7. A device for managing a Digital Subscriber Line (DSL) channel matrix, comprising:
   a storage unit configured to store one or more history records of channel information of one or more users;
   a channel matrix unit configured to store the DSL channel matrix comprising channel information of one or more current logged on users;
   an obtaining unit configured to obtain logging information about whether a user logs on or logs off and configured to send an indication to a management unit indicating that the user logs on when the user logs on, or send an indication to the management unit indicating that the user logs off when the user logs off; and
   the management unit configured to add a history record of channel information of the user to the DSL channel matrix from the storage unit according to the indication indicating that the user logs on, and record channel information of the user in the DSL channel matrix into the storage unit and delete channel information of the user from the DSL channel matrix according to the indication indicating that the user logs off.

8. The device according to claim 7, wherein the storage unit is a database storage unit.

9. The device according to claim 7, wherein the obtaining unit is a DSL Access Multiplex management layer entity.

10. The device according to claim 7, further comprising:
    a tracking unit configured to track channels of logging on users and send adjusted channel information to the DSL channel matrix unit to update current channel information of the logging on users in the DSL channel matrix.

11. A Digital Subscriber Line Access Multiplexer comprising:
    an obtaining unit configured to obtain logging information about whether a user logs on or logs off;
    a notification unit configured to send an indication to a management unit indicating that the user logs on when the user logs on, or send an indication to the management unit indicating that the user logs off when the user logs off; and
    the management unit configured to add a history record of channel information of the user to a channel matrix according to the indication indicating that the user logs on, record channel information of the user in the channel matrix, and delete current channel information of the user from the channel matrix according to the indication indicating that the user logs off.

12. The DSLAM according to claim 11, further comprising:
a tracking unit that is operable to track channels of logging on users and update current channel information of the logging on users in the channel matrix with adjusted channel information.

13. A method for eliminating a crosstalk, comprising:
obtaining logging information about whether a user logs on or logs off;
adding a history record of channel information of the user to a channel matrix when the user logs on;
recording current channel information of the user in the channel matrix and deleting the current channel information of the user from the channel matrix when the user logs off; and
eliminating the crosstalk on a channel of the user according to the channel matrix.

14. The method according to claim 13, further comprising:
tracking and adjusting channel information of all users in the channel matrix, and
updating current channel information of all users in the channel matrix with the adjusted channel information.

15. The method according to claim 13, wherein eliminating the crosstalk according to the channel matrix comprises:
eliminating the crosstalk between users with QR decomposition method of a matrix or singular value decomposition (SVD) method according to the channel matrix.

\* \* \* \* \*

UNITED STATES PATENT AND TRADEMARK OFFICE
CERTIFICATE OF CORRECTION

PATENT NO. : 8,391,125 B2
APPLICATION NO. : 12/202921
DATED : March 5, 2013
INVENTOR(S) : Jun Zhou et al.

Page 1 of 1

It is certified that error appears in the above-identified patent and that said Letters Patent is hereby corrected as shown below:

On the Title Page

In the left column, item (75), replace "Gouzhou Long," with --Guozhu Long,--.

Signed and Sealed this
Twenty-first Day of May, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,391,125 B2  Page 1 of 1
APPLICATION NO. : 12/202921
DATED : March 5, 2013
INVENTOR(S) : Jun Zhou et al.

It is certified that error appears in the above-identified patent and that said Letters Patent is hereby corrected as shown below:

In the Claims

In column 9, claim 1, line 59, before "channel information of" delete "current".

In column 9, claim 1, line 60, after "storing the recorded" delete "current".

In column 9, claim 1, line 62, after "user and deleting the" delete "current".

In column 10, claim 4, line 10, after "and updating the" delete "current".

In column 10, claim 5, line 13, after "wherein the" delete "current".

In column 10, claim 7, line 42, after "unit and delete" insert --the--.

In column 10, claim 10, line 52, after "unit to update" delete "current".

In column 11, claim 13, line 14, before "channel information" delete "current".

In column 11, claim 13, line 15, after "and deleting the" delete "current".

Signed and Sealed this
Twelfth Day of August, 2014

Michelle K. Lee
*Deputy Director of the United States Patent and Trademark Office*